(12) United States Patent
Callard et al.

(10) Patent No.: US 9,344,243 B2
(45) Date of Patent: May 17, 2016

(54) TRANSMISSION USING COMMON AND DEDICATED PILOTS

(75) Inventors: Aaron Callard, Ottawa (CA);
Dong-Sheng Yu, Ottawa (CA);
Mohammadhadi Baligh, Kanata (CA);
Jianglei Ma, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 306 days.

(21) Appl. No.: 13/255,358

(22) PCT Filed: Mar. 16, 2010

(86) PCT No.: PCT/CA2010/000376
§ 371 (c)(1),
(2), (4) Date: Oct. 11, 2011

(87) PCT Pub. No.: WO2010/105345
PCT Pub. Date: Sep. 23, 2010

(65) Prior Publication Data
US 2012/0020434 A1    Jan. 26, 2012

Related U.S. Application Data

(60) Provisional application No. 61/160,452, filed on Mar. 16, 2009, provisional application No. 61/244,185, filed on Sep. 21, 2009.

(51) Int. Cl.
*H04L 25/49*     (2006.01)
*H04L 5/00*      (2006.01)
(Continued)

(52) U.S. Cl.
CPC .............. *H04L 5/005* (2013.01); *H04L 5/0051* (2013.01); *H04B 7/0417* (2013.01); *H04B 7/0478* (2013.01); *H04B 7/068* (2013.01); *H04B 7/0639* (2013.01)

(58) Field of Classification Search
CPC .. H04B 7/0639; H04L 25/0224; H04L 5/005; H04L 5/0051
USPC .................................................. 375/295, 296
See application file for complete search history.

(56) References Cited

U.S. PATENT DOCUMENTS

2008/0108310 A1*  5/2008 Tong et al. ................ 455/69
2008/0212702 A1*  9/2008 Pan et al. ................. 375/260
(Continued)

FOREIGN PATENT DOCUMENTS

CN        101299634       11/2008
CN        101350801        1/2009
(Continued)

OTHER PUBLICATIONS

Extended European Search Report issued in European Application No. 10753029.7 on Oct. 25, 2012; 12 pages.
(Continued)

*Primary Examiner* — Ross Varndell
(74) *Attorney, Agent, or Firm* — Fish & Richardson P.C.

(57) ABSTRACT

A method, system, base station and wireless terminal are provided for transmission of a set of mixed pilots that includes both common and dedicated pilots. The method includes selecting a number D of dedicated pilots having regard to performance of the communication link, $D \geq 0$, selecting a first pre-coder for pre-coding D dedicated pilots based on some criteria, performing a first pre-coding of the D dedicated pilots with the first pre-coder to produce a set of pre-coded dedicated pilots, performing a second pre-coding of the set of pre-coded dedicated pilots and a set of common pilots to produce a set of mixed pilots, and transmitting data from the transmitter on the communication link with the set of mixed pilots.

22 Claims, 8 Drawing Sheets

(51) Int. Cl.
*H04B 7/04* (2006.01)
*H04B 7/06* (2006.01)

(56) References Cited

U.S. PATENT DOCUMENTS

| | | | |
|---|---|---|---|
| 2008/0225993 A1 | 9/2008 | Malladi et al. | |
| 2008/0240274 A1* | 10/2008 | Han et al. | 375/260 |
| 2008/0260058 A1* | 10/2008 | Li | 375/260 |
| 2009/0219838 A1* | 9/2009 | Jia et al. | 370/278 |
| 2010/0009718 A1* | 1/2010 | Higuchi et al. | 455/562.1 |
| 2010/0266060 A1* | 10/2010 | Kimura et al. | 375/267 |
| 2011/0158345 A1* | 6/2011 | Ihm et al. | 375/295 |

FOREIGN PATENT DOCUMENTS

| | | |
|---|---|---|
| EP | 2068479 A1 | 6/2009 |
| JP | 2007-89113 | 4/2007 |
| JP | 2007-124553 | 5/2007 |
| JP | 2008-92374 | 4/2008 |
| WO | 2007/052941 | 5/2007 |
| WO | 2008/041677 | 4/2008 |
| WO | 2008103317 | 8/2008 |
| WO | 2008117984 A1 | 10/2008 |
| WO | 2009008180 | 1/2009 |
| WO | 2010027153 A2 | 3/2010 |

OTHER PUBLICATIONS

LG Electronics; "Downlink Reference Signal for Higher Order MIMO"; 3GPP TSG RAN WG1 Meeting #55bis (R1-090218); Ljubljana, Slovenia; Jan. 12-17, 2009; 8 pages.
Nortel; "Discussion on RS Designs for CoMP in LTE-A"; 3GPP TSG-RAN Working Group 1 Meeting #55bis (R1-090151); Ljubljana, Slovenia; Jan. 12-16, 2009; 4 pages.
International Search Report & Written Opinion, PCT Application No. PCT/ca2010/000376, Jun. 16, 2010 (Mar. 16, 2010), 9 pages.
Office Action issued in Chinese Application No. 201080021422.7 on Feb. 24, 2014; 3 pages. No translation.
Office Action issued in Chinese Application No. 201080021422.7 on Sep. 29, 2013; 24 pages.
Office Action issued in Russian Application No. 2011140068 on Feb. 21, 2014; 8 pages.
Samsung; "Issues on DL RS Design for Higher Order MIMO"; 3GPP TSG RAN WG1 #55 (R1-084169); Prague, Czech Republic; Nov. 10-14, 2008; 3 pages.
Sharp; "Backward Compatible Design of Downlink Reference Signals in LTE-Advanced"; 3GPP TSG RAN WG1 Meeting #55bis (R1-090023); Ljubljana, Slovenia; Jan. 12-16, 2009; 6 pages.
Office Action issued in Japanese Application No. 2012-500013 on Jan. 8, 2014; 5 pages.
Office Action issued in Chinese Application No. 201080021422.7 on May 27, 2014; 7 pages.
Office Action issued in Chinese Application No. 201080021422.7 on Jul. 23, 2014; 3 pages.
Notice of Allowance issued in Japanese Application No. 2012-500013 on Jun. 27, 2013; 4 pages. No translation.

* cited by examiner

TRANSMISSION USING COMMON AND DEDICATED PILOTS

CROSS REFERENCE TO RELATED APPLICATIONS

This application claims the benefit of and is a National Phase Entry of International Application No. PCT/CA2010/000376 filed Mar. 16, 2010, which claims the benefit of prior U.S. Provisional Application Nos. 61/160,452 filed Mar. 16, 2009 and 61/244,185 filed Sep. 21, 2009, which are hereby incorporated by reference in their entirety.

FIELD OF THE INVENTION

The present invention relates to wireless communication techniques in general, and to techniques of transmission using common and dedicated pilots, in particular.

BACKGROUND OF THE INVENTION

A communication link may be described in the form of $$y=H(x) \qquad (1)$$

where y is the received signal, x is the transmitted signal, and H represent the effects of the channel. In general y, H, and x are multi-dimensional with different dimensions representing time, frequency, receive antenna etc, and H(x) represents a general function of x. For simplicity it can be assumed that H can be represented by a M×N matrix, with y being a M×L vector, and x being a N×L vector, appreciating that this concept may be applied to more general environments. For illustrative purposes, we shall assume that the link represents a Multi-In-Multi-Out (MIMO) environment with N transmit antennas, M receive antennas, and L layers being transmitted.

In order for the receiver to coherently demodulate the transmitted data, knowledge of the channel H is needed. One method to achieve this knowledge is through the transmission of pilot symbols. These pilots can be either common, in which all/many mobile terminals can view them and determine the channel, or dedicated in which the channel knowledge is only available to a select group of mobile terminals. In many conventional wireless systems utilizing the common pilot scheme, the number of common pilots equals the number of transmit antennas, while in many conventional wireless systems utilizing the dedicated pilot scheme, the number of dedicated pilots equals the number of layers of data transmission.

In some cases, the transmitted signal x includes a pre-coded version of a data symbol s, pre-coded with a pre-coding matrix F chosen from a group of predefined matrices that is commonly called a codebook {F}. In some cases a receiver, for example a mobile terminal, tells a transmitter, for example a base station, which pre-coding matrix to use. For FDD (frequency division duplex) air interfaces the information identifying a pre-coding matrix may be fed back through either channel sounding approaches or codebook index approaches. TDD (time division systems) may also use the codebook based approach. A detailed example of an approach to pre-coding for MIMO transmission is described in it. J. Love, et al, "Limited Feedback Unitary Pre-coding for Spatial Multiplexing Systems", IEEE Trans. Inf. Theory, vol. 51, no. 8, pp. 2967-2976, August 2005.

Codebook index feedback involves the receiver signalling to the transmitter an index of which pre-coding matrix to use (so-called codeword index). There are a plurality of indexes each corresponding to a respective pre-coding matrix. One problem, however, is that codebook index feedback approaches use a large amount of uplink radio resources.

An example of the common pilot approach is shown in FIG. 1 for a two transmit antenna case. In FIG. 1 (and FIG. 2 discussed below), the horizontal axis 210 is frequency (OFDM (Orthogonal Frequency Division Multiplexing) sub-carriers) and the vertical axis 212 is time (OFDM symbols). Each small circle represents a transmission on a particular sub-carrier over a particular OFDM symbol duration. In locations 214, pilots are transmitted by a first transmit antenna Tx-1, and in locations 216, pilots are transmitted by a second transmit antenna Tx-2. Remaining locations are available for data transmission by both antennas. In the illustrated example, data includes pre-coded data 218 for a first UE (UE-1), which may, for example, be a mobile terminal, and pre-coded data 220 for a second UE (UE-2), which may also be a mobile terminal. Typically, the pre-coding applied for pre-coded data 218 will be different from that applied for pre-coded data 220. With the common pilot approach, the same pilots are used for both UEs and are not pre-coded.

An example of the dedicated pilot approach in an OFDM signalling scheme is shown in FIG. 2 for a two transmit antenna case. In locations 222,224, dedicated pilots specific to a first UE are transmitted by a first transmit antenna Tx-1 and second antenna Tx-2 respectively. In locations 226,228, dedicated pilots specific to a second UE are transmitted by a first transmit antenna Tx-1 and second transmit antenna Tx-2 respectively. Remaining locations are available for data transmission by both antennas. In the illustrated example, data includes pre-coded data 230 for a first UE (UE-1), and pre-coded data 232 for a second UE (UE-2). Typically, the pre-coding applied for pre-ceded data 230 will be different from that applied for pre-coded data 230. With the dedicated pilot approach, different pilots are used for each UE in the sense that they are pre-coded using the same pre-coding matrix as used for the data for each user.

In general, since both pilot and data go through the same channel, a dedicated pilot scheme is more resilient to code-word index feedback error than common pilot based schemes.

Both pilot schemes have their own strengths and weaknesses. Common pilots overhead grows linearly with the number of transmit antennas, while the performance only increases proportionally to the logarithm of the number of transmit antennas. However, the overhead for each common pilot is much lower, as compared to the overhead associated with a dedicated pilot, as a common pilot can be shared between many users. Dedicated pilots have significantly higher overhead per layer; however the overhead increases linearly with the number of layers, which is the same rate as the increase in performance.

In addition, common pilots, due to their constant availability to most/all mobile terminals may be utilized for measurements/feedback, although the overhead for common pilots must be paid by all users even if they receive no benefit from them.

In a dedicated pilot based scheme, pilots can be pre-coded, and hence have the same channel matrices as data. One problem, however, is that since each UE (mobile terminal) trying to communicate with a base transceiver station (BTS) does not know what pre-coding matrix is being used by other UEs, the UE is typically unable to monitor the channel. More specifically, they do not know which pre-coding matrix is being used, do not know the rank of the current channel, cannot estimate per-layer based signal to interference noise

3 ratio (SINR), and are unable to do channel dependent scheduling, to name a few examples.

SUMMARY

According to one broad aspect of the present invention, there is provided a method of transmitting from a transmitter on a communication link, the method comprising: selecting a number D of dedicated pilots having regard to performance of the communication link, D≥0; selecting a first pre-coder for pre-coding D dedicated pilots based on some criteria; performing a first pre-coding of the D dedicated pilots with the first pre-coder to produce a set of pre-coded dedicated pilots; performing a second pre-coding of the set of pre-coded dedicated pilots and a set of common pilots to produce a set of mixed pilots; and transmitting data from the transmitter on the communication link with the set of mixed pilots.

In some embodiments, the transmitter includes a plurality of transmit antennas and transmitting data from the transmitter comprises transmitting the data from the transmitter on the communication link with the set of mixed pilots via the plurality of transmit antennas.

In some embodiments, performing the second pre-coding to produce the set of mixed pilots comprises an SVD (Singular Value Decomposition) based pre-coding, or an approximation thereof.

In some embodiments, performing the second pre-coding to produce the set of mixed pilots comprises performing a transmit diversity based pre-coding.

In some embodiments, performing the transmit diversity based pre-coding comprises performing any one of a SFBC (space frequency block code) based pre-coding and a CDD (cyclic delay diversity) based pre-coding.

In some embodiments, selecting the number D of dedicated pilots having regard to performance of the communication link comprises selecting the number D of dedicated pilots having regard to throughput of the communication link taking into account signalling overhead associated with the common and dedicated pilots.

In some embodiments, selecting the first pre-coder for pre-coding the D dedicated pilots based on some criteria comprises selecting the first pre-coder to maximize received power of the D dedicated pilots, subject to a constraint that the first pre-coder remain orthogonal to a second pre-coder used to pre-code the set of common pilots.

In some embodiments, the method further comprises, receiving feedback pertaining to the first pre-coding of the D dedicated pilots.

In some embodiments, selecting the first pre-coder for pre-coding the D dedicated pilot based on some criteria is an iterative process based on the feedback.

In some embodiments, selecting the first pre-coder further comprises selecting the first pre-coder to mitigate interference caused by transmitting the data with the set of mixed pilots.

In some embodiments, performing the second pre-coding to produce the set of mixed pilots comprises: pre-coding the set of pre-coded dedicated pilots with an identity matrix after the first pre-coding, such that the set of mixed pilots contains dedicated pilots aligned with the transmitted data; and pre-coding the set of common pilots with a codebook, such that the set of mixed pilots includes pre-coded common pilots.

In some embodiments, transmitting data on the communication link with the set of mixed pilots via the plurality of transmit antennas comprises: transmitting the dedicated pilots of the mixed set of pilots on a first set of transmit antennas of the plurality of transmit antennas; and transmitting the pre-coded common pilots of the mixed set of pilots on a second set of transmit antennas of the plurality of transmit antennas.

In some embodiments, the transmitter comprises a plurality of transmitters and the first set of transmit antennas is located at a first one of the plurality of transmitters and the second set of transmit antennas is located at a second one of the plurality of transmitters.

In some embodiments, transmitting the data with the set of mixed pilots comprises transmitting the data cooperatively from at least the first transmitter and the second transmitter of the plurality of transmitters.

According to another broad aspect of the present invention, there is provided a wireless communication system comprising: a plurality of wireless terminals; and a base station having a plurality of transmit antennas and configured to transmit data to the plurality of wireless terminals on respective communication links, wherein for each communication link, the base station is configured to: select a number D of dedicated pilots having regard to performance of the communication link, D≥0; select a first pre-coder for pre-coding D dedicated pilots based on some criteria; perform a first pre-coding of the D dedicated pilots with the first pre-coder to produce a set of pre-coded dedicated pilots; perform a second pre-coding of the set of pre-coded dedicated pilots and a set of common pilots to produce a set of mixed pilots; and transmit data from the base station to the respective wireless terminal on the communication link with the set of mixed pilots via the plurality of transmit antennas.

In some embodiments, the base station is configured to perform the second pre-coding to produce the set of mixed pilots by performing an SVD (Singular Value Decomposition) based pre-coding, or an approximation thereof.

In some embodiments, the base station is configured to perform the second pre-coding to produce the set of mixed pilots by performing a transmit diversity based pre-coding.

In some embodiments, the base station is configured to perform the transmit diversity based pre-coding by performing any one of a SFBC (space frequency block code) based pre-coding and a CDD (cyclic delay diversity) based pre-coding.

In some embodiments, the base station is configured to select the number D of dedicated pilots having regard to throughput of the communication link taking into account signalling overhead associated with the common and dedicated pilots.

In some embodiments, the base station is configured to select the first pre-coder to maximize received power of the D dedicated pilots at the respective wireless terminal, subject to a constraint that the first pre-coder remain orthogonal to a second pre-coder used to pre-code the set of common pilots.

In some embodiments, one or more of the plurality of wireless terminals is configured to provide feedback to the base station pertaining to the first pre-coding of the D dedicated pilots.

In some embodiments, the base station is configured to select the first pre-coder for pre-coding the D dedicated pilot using an iterative process based on the feedback.

In some embodiments, the base station is configured to select the first pre-coder having regard to mitigating interference generated by the base station.

In some embodiments, the base station is further configured to: pre-code the set of pre-coded dedicated pilots with an identity matrix after the first pre-coding, such that the set of mixed pilots contains dedicated pilots aligned with the transmitted data; and pre-code the set of common pilots with a codebook, such that the set of mixed pilots includes pre-coded common pilots.

In some embodiments, the base station is further configured to: transmit the dedicated pilots of the mixed set of pilots on a first set of transmit antennas of the plurality of transmit antennas; and transmit the pre-coded common pilots of the mixed set of pilots on a second set of transmit antennas of the plurality of transmit antennas.

In some embodiments, the base station comprises a plurality of base stations, and the first set of transmit antennas is located at a first one of the plurality of base stations and the second set of transmit antennas is located at a second one of the plurality of base stations.

In some embodiments, at least the first base station and second base station of the plurality of base stations are configured to cooperatively transmit the data with the set of mixed pilots.

According to yet another broad aspect of the present invention, there is provided a base station configured to transmit data on a communication link, the base station comprising: a plurality of transmit antennas; a pre-coder configured to: select a number D of dedicated pilots having regard to performance of the communication link, D≥0; select a first pre-coder for pre-coding D dedicated pilots based on some criteria; perform a first pre-coding of the D dedicated pilots with the first pre-coder to produce a set of pre-coded dedicated pilots; and perform a second pre-coding of the set of pre-coded dedicated pilots and a set of common pilots to produce a set of mixed pilots; and a radio transmitter configured to transmit data on the communication link with the set of mixed pilots via the plurality of transmit antennas.

In some embodiments, the pre-coder is configured to perform the second pre-coding to produce the set of mixed pilots by performing an SVD (Singular Value Decomposition) based pre-coding, or an approximation thereof.

In some embodiments, the pre-coder is configured to perform the second pre-coding to produce the set of mixed pilots by performing a transmit diversity based pre-coding.

In some embodiments, the pre-coder is configured to perform the transmit diversity based pre-coding by performing any one of a SFBC (space frequency block code) based pre-coding and a CDD (cyclic delay diversity) based pre-coding.

In some embodiments, the pre-coder is configured to select the number D of dedicated pilots having regard to throughput of the communication link taking into account signalling overhead associated with the common and dedicated pilots.

In some embodiments, the pre-coder is configured to select the first pre-coder to maximize received power of the D dedicated pilots at the respective wireless terminal, subject to a constraint that the first pre-coder remain orthogonal to a second pre-coder used to pre-code the set of common pilots.

In some embodiments, the base station further comprises a wireless receiver configured to receive feedback pertaining to the first pre-coding of the D dedicated pilots.

In some embodiments, n the pre-coder is configured to select the first pre-coder for pre-coding the D dedicated pilot using an iterative process based on the feedback.

In some embodiments, the pre-coder is configured to select the first pre-coder having regard to mitigating interference generated by the base station.

In some embodiments, the pre-coder is further configured to: pre-code the set of pre-coded dedicated pilots with an identity matrix after the first pre-coding, such that the set of mixed pilots contains dedicated pilots aligned with the trans-mitted data; and pre-code the set of common pilots with a codebook, such that the set of mixed pilots includes pre-coded common pilots.

In some embodiments, the wireless transmitter is further configured to: transmit the dedicated pilots of the mixed set of pilots on a first set of transmit antennas of the plurality of transmit antennas; and transmit the pre-coded common pilots of the mixed set of pilots on a second set of transmit antennas of the plurality of transmit antennas.

In some embodiments, the base station comprises a plurality of transmission sites, and the first set of transmit antennas is located at a first one of the plurality of transmission sites and the second set of transmit antennas is located at a second one of the plurality of transmission sites.

In some embodiments, the wireless transmitter is configured to cooperatively transmit the data with the set of mixed pilots with at least one other wireless transmitter.

According to still another broad aspect of the present invention, there is provided a wireless terminal comprising a wireless transceiver configured to receive a transmission containing data and a set of mixed pilots generated according to a method in accordance with the first broad aspect of the present invention.

Other aspects and features of the present invention will become apparent, to those ordinarily skilled in the art, upon review of the following description of the specific embodiments of the invention.

BRIEF DESCRIPTION OF THE DRAWINGS

Embodiments of the present invention will now be described, by way of example only, with reference to the accompanying drawing figures, wherein.

DETAILED DESCRIPTION

Figure 1:
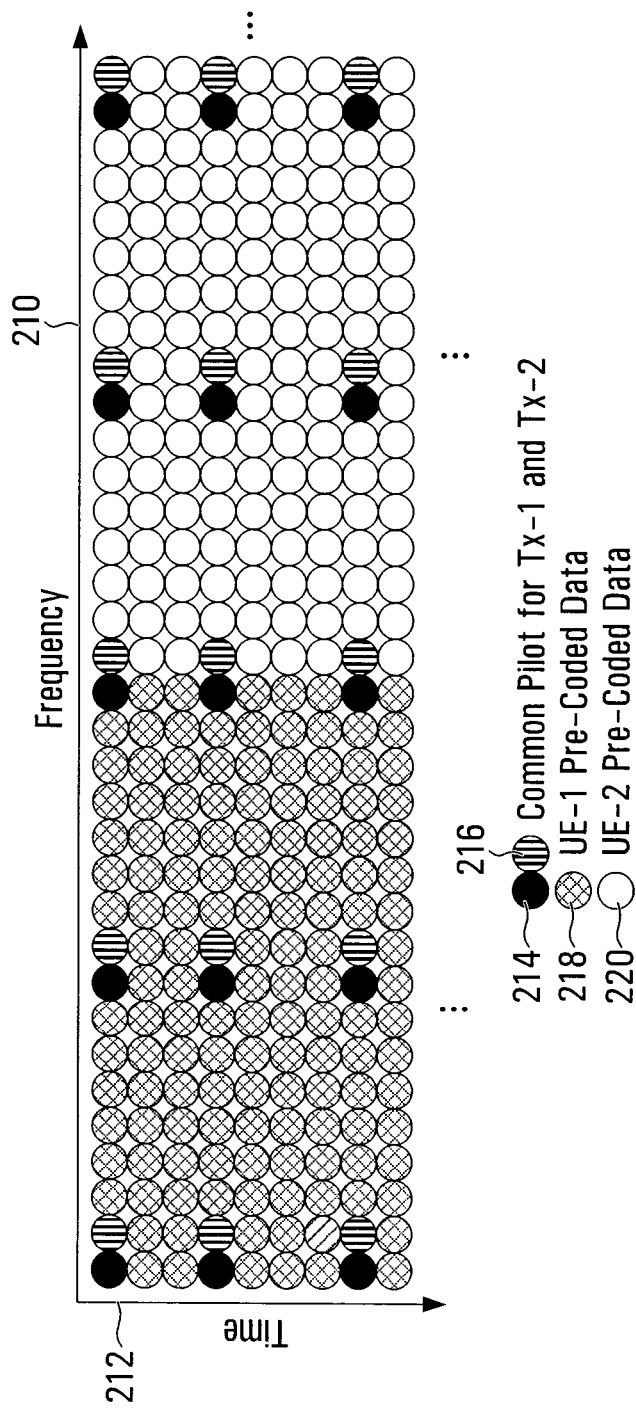
FIG. 1 is an OFDM signal layout diagram for transmit signals that include common pilots.
Figure 2:
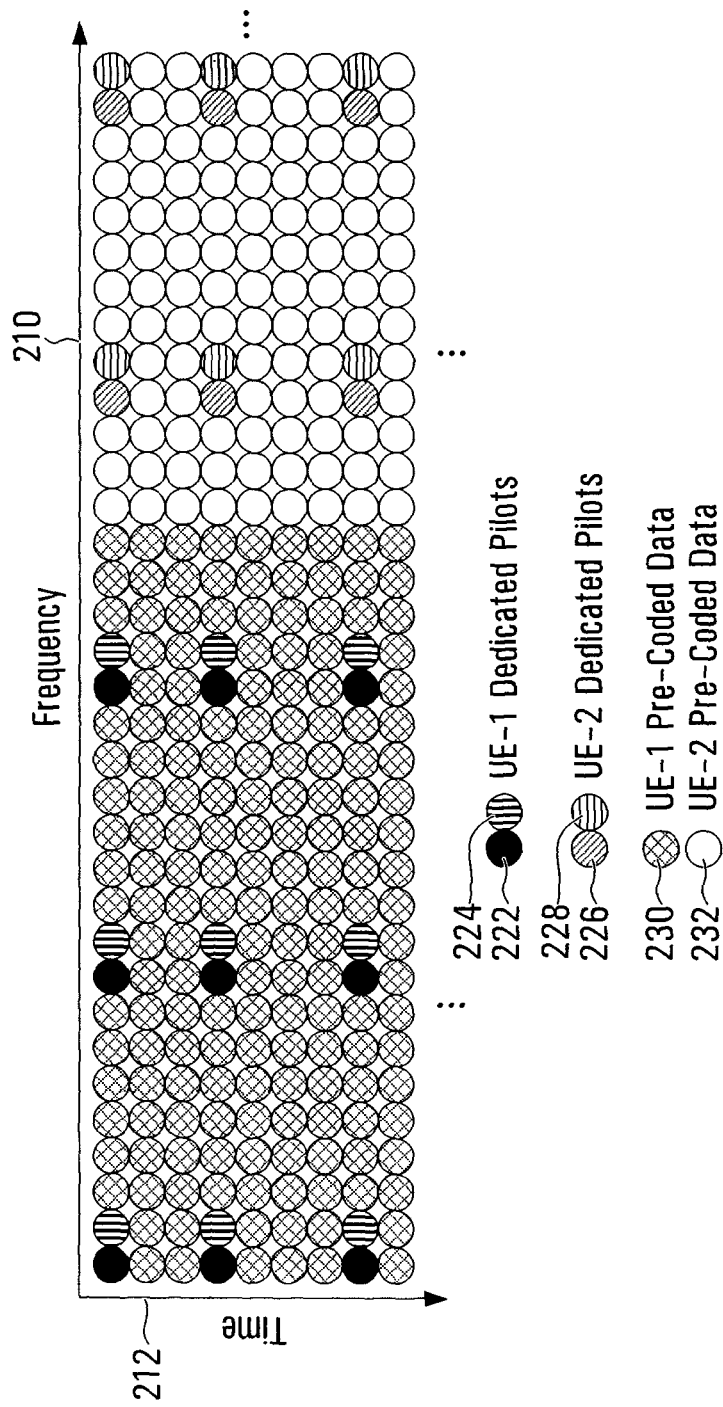
FIG. 2 is an OFDM signal layout diagram for transmit signals that include dedicated pilots.

In the following detailed description of sample embodiments, reference is made to the accompanying drawings, which form a part hereof, and in which is shown by way of illustration specific sample embodiments in which the present invention may be practiced. These embodiments are described in sufficient detail to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

In accordance with embodiments of the invention various systems and methods that involve mixing common and dedicated pilots are described. Specifically the embodiments presented below may be used in future 3GPP, 3GPP2 and IEEE 802.16 based wireless standards. The broader inventions set out in the summary, however, are not limited in this regard.

As noted above, common pilot schemes and dedicated pilot schemes have their own strengths and weaknesses. While increased performance can potentially be realized by adding additional transmit antennas with an additional common pilot per additional transmit antenna, the additional overhead for a large number of transmit antennas, for example, for greater than four transmit antennas, for the additional common pilots means that the performance gains are often not worth it. Dedicated pilots have significantly higher overhead per layer; however the overhead increases linearly with the number of layers, which is the same rate as the increase in performance. Dedicated pilots have been used when a large number of transmit antennas are present; however some common pilots often remain necessary for measurement/feedback and/or for broadcast messages. The overhead associated with this common pilot overhead is then wasted when regular data is transmitted. Thus dedicated pilots tend to perform better when there are a large number of transmit antennas, while common pilots tend to perform better when the number of layers is large.

Embodiments of the present invention may utilize the beneficial aspects of both common and dedicated pilot schemes by mixing both common and dedicated pilots for data transmission.

In general, three principles may be observed in embodiments of the present invention:

1) only using dedicated pilots if they increase performance, which may be done, for example, by adapting the number of dedicated pilots to a given situation (possibly sending no dedicated pilots at all).

2) Choose the pre-coders for the dedicated pilots to maximize the performance after combination with the common pilots.

3) Perform pre-coding on top of both dedicated and common pilots. This pre-coding could be anything normally applied to common pilots, such as, for example, SVD (Singular Value Decomposition), or a practical approximation thereof, transmit diversity (Alamouti, CDD (cyclic delay diversity), or simple identity Spatial Multiplexing (SM) precoding. An example of an algorithm that approximates SVD is the QLP Algorithm, which is described, for example, in "On the Convergence of Stewart's QLP Algorithm for Approximating the SVD" Huckaby D. A.; Chan T. F., Numerical Algorithms, Volume 32, Numbers 2-4, April 2003, pp. 287-316(30). Other examples include Thin SVD, Truncated SVD and Compact SVD.

Reference will now be made to FIGS. 3 to 8, 9A and 9B, which illustrate various examples of networks, network nodes and mobile terminals in which embodiments of the present invention could potentially be realized.

Figure 3:
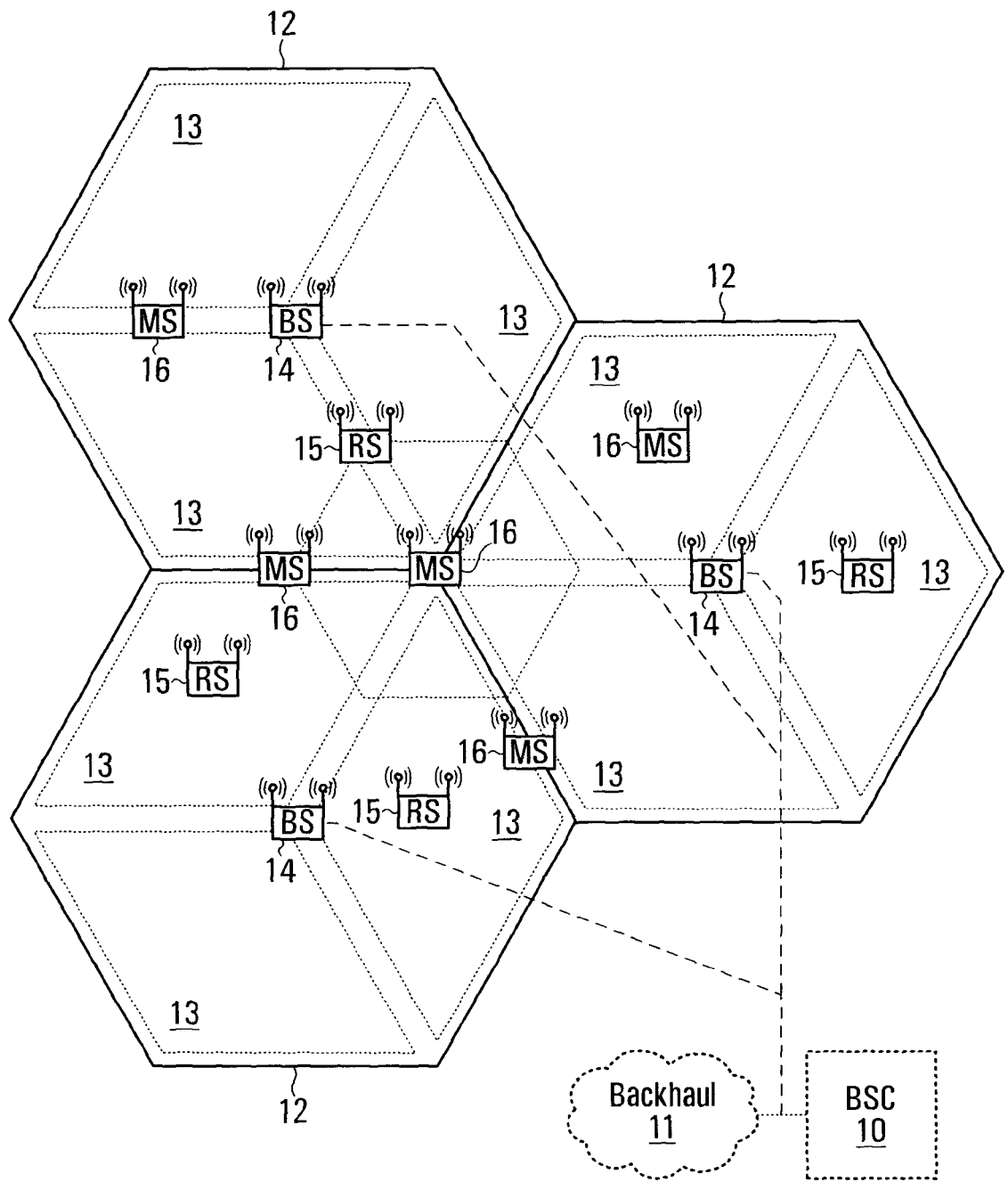
FIG. 3 is a block diagram of a cellular communication system.

Referring first to FIG. 3, FIG. 3 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with 20 mobile and/or wireless terminals 16, which are within the cell 12 associated with the corresponding base station 14. The movement of the mobile terminals 16 in relation to the base stations 14 results insignificant fluctuation in channel conditions. As illustrated, the base stations 14 and mobile terminals 16 may include multiple antennas to provide spatial diversity for communications. In 3some configurations, relay stations 15 may assist in communications between base stations 14 and wireless terminals 16. Wireless terminals 16 can be handed off from any cell 12, sector 13, zone (not shown), base station 14 or relay 15 to another cell 12, sector 13, zone (not shown), base station 14 or relay 15. In some configurations, base stations 14 communicate with each and with another network (such as a core network or the Internet, both not shown) over a backhaul network 11. In some configurations, a base station controller 10 is not needed.

Figure 4:
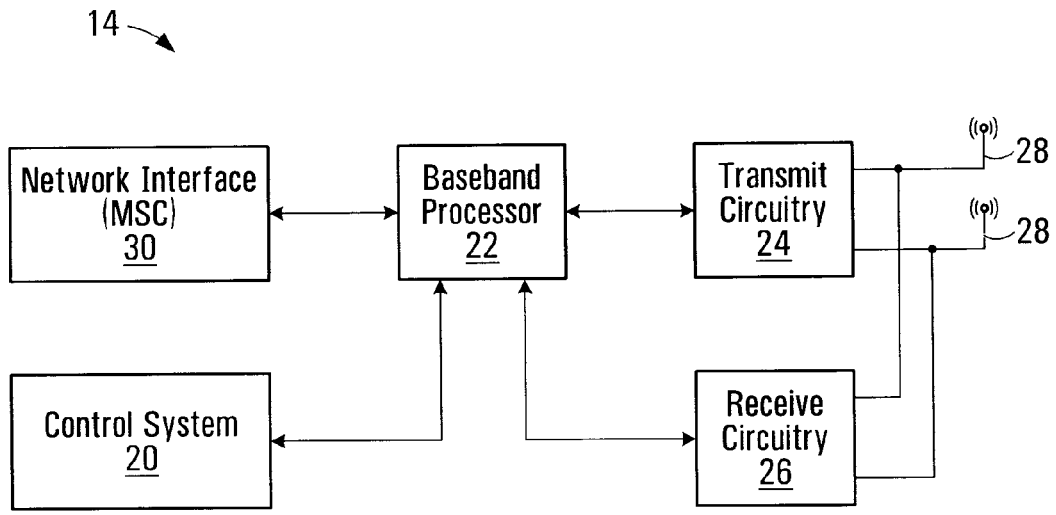
FIG. 4 is a block diagram of an example base station that might be used to implement some embodiments of the present invention.

With reference to FIG. 4, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 5) and relay stations 15 (illustrated in FIG. 6). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated 20 circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 5:
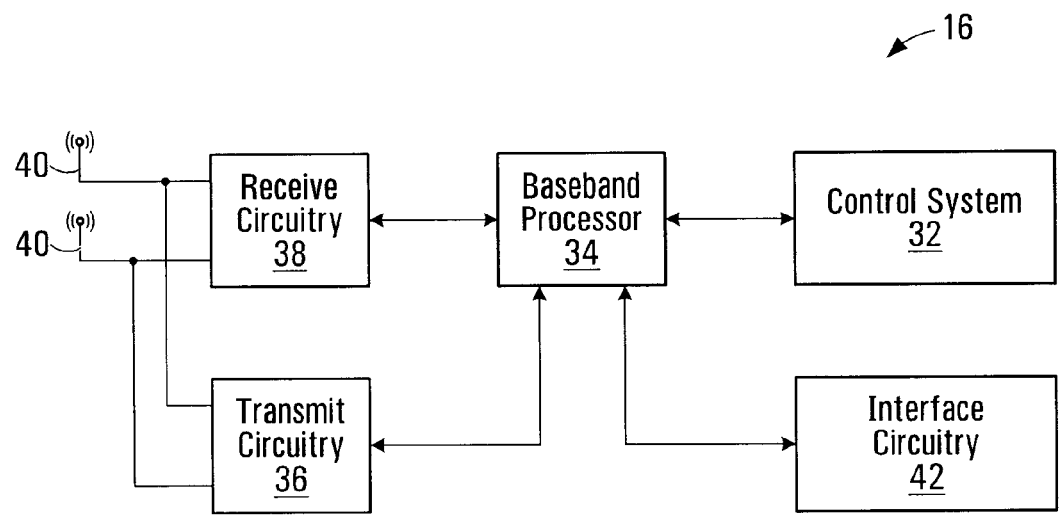
FIG. 5 is a block diagram of an example wireless terminal that might be used to implement some embodiments of the present invention.

With reference to FIG. 5, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for 20 transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 20 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 6:
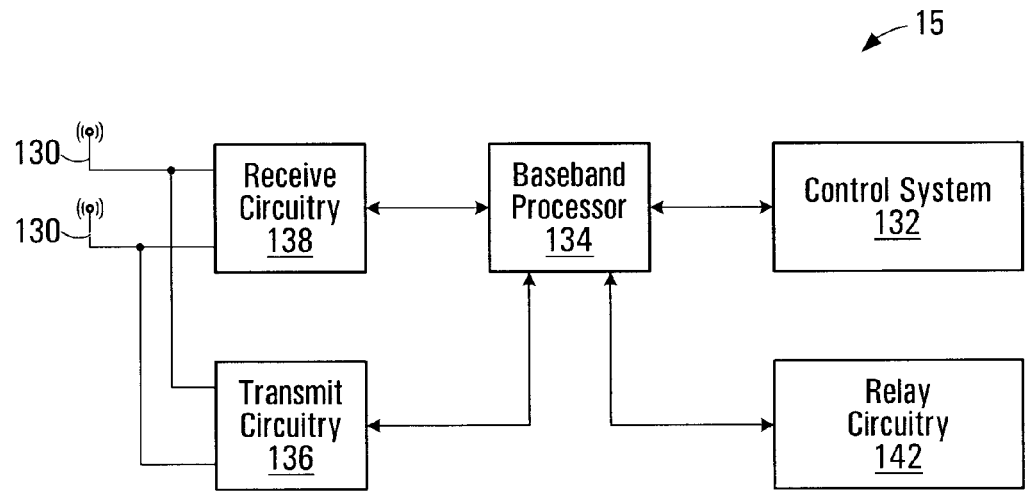
FIG. 6 is a block diagram of an example relay station that might be used to implement some embodiments of the present invention.

With reference to FIG. 6, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or 20 frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 7:
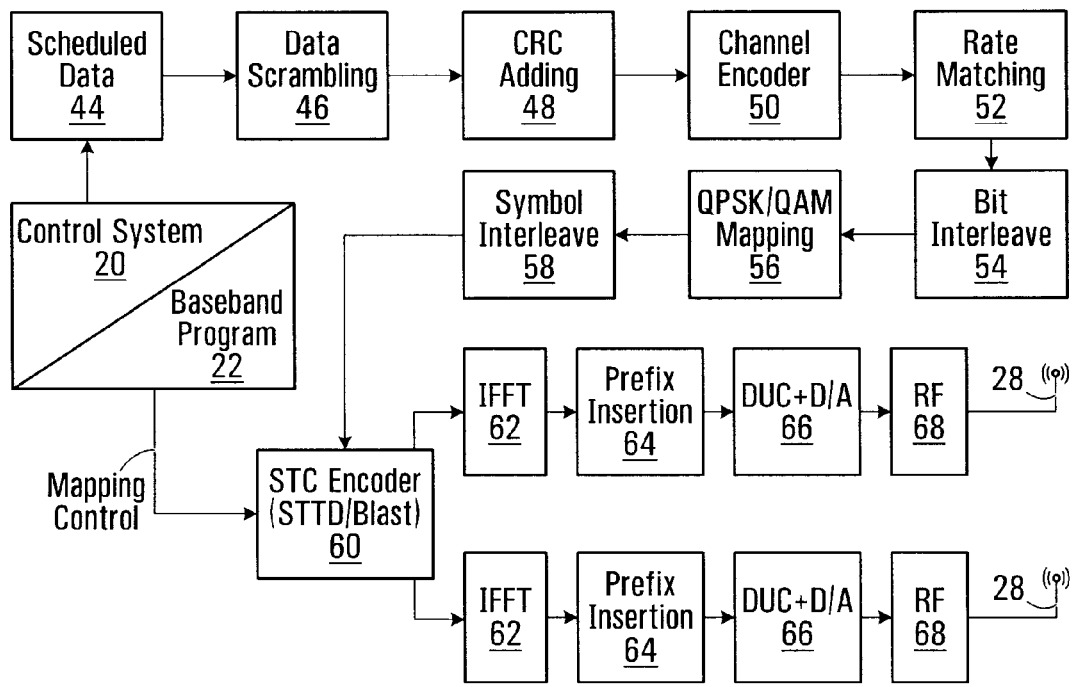
FIG. 7 is a block diagram of a logical breakdown of an example OFDM transmitter architecture that might be used to implement some embodiments of the present invention.

With reference to FIG. 7, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the 20 loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 7 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides 20 symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the 9 intended mobile terminal 16 are scattered among the sub-carriers. The mobile terminal 16, which is discussed in detail below, will use the pilot signals for channel estimation.

Figure 8:
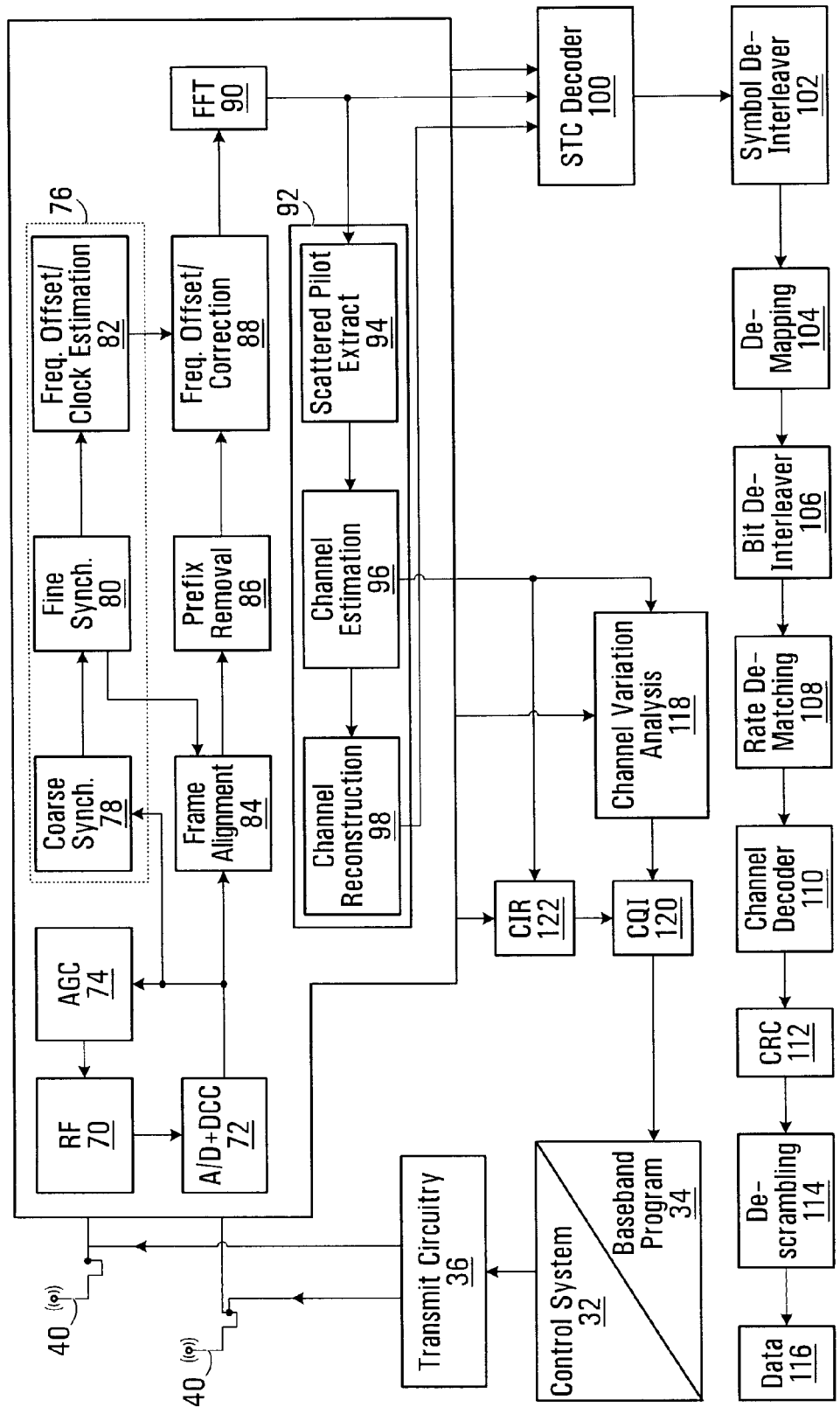
FIG. 8 is a block diagram of a logical breakdown of an example OFDM receiver architecture that might be used to implement some embodiments of the present invention.

Reference is now made to FIG. 8 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is 20 based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 8, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel 20 reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for descrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, SC-FDMA (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFT pre-coded OFDMA scheme, or, it can be viewed as a single carrier (SC) multiple access scheme.

Figure 9A:
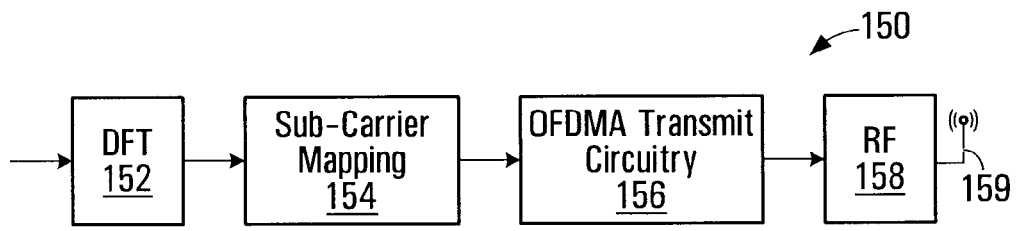
FIG. 9A is a block diagram of a SC-FDMA transmitter.
Figure 9B:
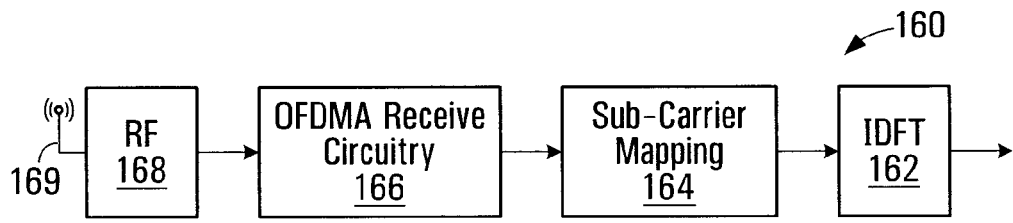
FIG. 9B is a block diagram of a SC-FDMA receiver.

Aspects of SC-FDMA signaling are now discussed with reference to FIGS. 9A and 9B, which provide examples of a conventional SC-FDMA transmitter 150 and receiver 160 for single-in single-out (SISO) communication. In SISO, mobile stations transmit on one antenna and base stations and/or relay stations receive on one antenna. FIGS. 9A and 9B illustrate one example of signal processing steps/blocks that may be used at the transmitter and receiver for SC-FDMA signaling.

The SC-FDMA transmitter 150 illustrated in FIG. 9A includes a signal processing path that includes a DFT 152, a Sub-carrier mapper 154, OFDMA transmit circuitry 156, a radio frequency (RF) radio 158 and a transmit antenna 159.

The SC-FDMA receiver 160 illustrated in FIG. 9B includes a signal processing path that includes a receive antenna 169, an RF radio 168, OFDMA receive circuitry 166, a Sub-Carrier mapper 164 and an IDFT 162.

As noted above, the example SC-FDMA transmitter 150 and receiver 160 illustrated in FIGS. 9A and 9B are configured for single-in single-out (SISO) configuration. In SISO, mobile terminals and network nodes transmit and receive on one antenna. However, it should be understood that embodiments of the present invention are not limited to SISO operation. FIGS. 9A and 9B are provided merely as specific examples to illustrate configurations and modes of operation that may be utilized in some embodiments of the present invention.

There are several similarities in the overall transceiver processing of SC-FDMA and OFDMA. Those common aspects between OFDMA and SC-FDMA are illustrated in the OFDMA transmit circuitry 156 and OFDMA receive circuitry 166, as they would be obvious to a person having ordinary skill in the art in view of the present specification. SC-FDMA is distinctly different from OFDMA because of the DFT 152 pre-coding of the modulated symbols, and the corresponding IDFT 162 of the demodulated symbols. Because of this pre-coding, the SC-FDMA sub-carriers are not independently modulated as in the case of the OFDMA sub-carriers. As a result, the peak to average power ratio (PAPR) of SCFDMA signaling is lower than the PAPR of OFDMA signaling, which means that the transmit power efficiency of SC-FDMA is generally higher than that of OFDMA signaling.

FIGS. 3 to 8, 9A and 9B provide specific examples of communication systems and components thereof that could potentially be used to implement embodiments of the present invention. It is to be understood that embodiments of the present invention can be implemented with communications systems having architectures that are different than the specific examples discussed above, but that operate in a manner consistent with the implementation of the embodiments as described herein.

As noted earlier with reference to Eq. (1), a communication link may be described in the form of y=H(x) where y is the received signal, x is the transmitted signal, and H represent the effects of the channel.

For illustrative purposes, we shall assume that the link represents a Multi-In-Multi-Out (MIMO) environment with N transmit antennas, M receive antennas, and L layers being transmitted, such that H can be represented by a M×N matrix, with y being a M×L vector, and x being a N×L vector, appreciating that this concept may be applied to more general environments.

For illustrative purposes we shall consider a transmitter with N transmit antennas having C common pilots which are transmitted using a pre-coding matrix $P_C$. We can additionally have D dedicated pilots with pre-coding matrix $P_D$. To maintain the same properties of transmission (i.e. not complicate the power constraint on transmission) $P_D$ may be selected to be orthonormal and orthogonal to $P_C$. The channel which is visible to the mobile is thus $$H_{eff}=H[P_C P_D.] \quad (2)$$

If, for example, SVD is being used to pre-code the combined common and dedicated pilots, it would generally be preferred to maximize the sum of the singular values of $H_{eff}$ which correspond to the transmitted streams. Other transmission schemes have similar but slightly different requirements.

One case to consider is one in which the number of streams is less than the number of receive antennas. If perfect knowledge of the channel is available at the transmitter, that is, we assume that the transmitter knows what the received vector will be (i.e. the SVD of the perfect H, which we define to be S), the sum of the singular values can be written as $$\text{trace}(SH_{eff}H_{eff}^H S) = \text{trace}\left( \begin{matrix} [SHP_C \quad SHP_D] \\ [P_C^H H^H S^H \quad P_D^H H^H S^H] \end{matrix} \right) \quad (3)$$
$$= \text{trace}(SHP_C P_C^H H^H S^H) +$$
$$\text{trace}(SHP_D P_D^H H^H S^H).$$

The choice of $P_D$ can be chosen to maximize trace($SHP_D P_D^H H^H S^H$) for receiver S, under the constraint that $P_D$ is orthonormal and orthogonal to $P_C$. The solution to this problem is for $P_D$ to be the top D singular vectors of $S^H*H*P_{\sim C}$. Where $P_{\sim C}$ is any set of orthonormal vectors such that [$P_C$ $P_{\sim C}$] is full rank.

In some embodiments, for the foregoing case the $P_D$ may be determined in a two step process that involves first calculating S by determining $$S=\text{the top } X \text{ singular vectors of } H \quad (4)$$

Where X is the number of and then calculating $H_{eff}$ and $P_D$ according to $$H_{eff} = S^H * H \quad (5)$$

$$P_D = \text{vectors which maximize power of dedicated pilots} \quad (6)$$
$$= \text{top } D \text{ singular vectors of } H_{eff} * P_{\sim C}.$$

Another case to consider is the situation in which the number of streams is equal to the number of receive antennas. If only partial information is available (or to reduce feedback from the mobile) a simple solution which allows for easy implementation is to assume full rank transmission and let S equal the identity matrix I. In this case $P_D$ may be chosen to maximize $$\text{trace}(H_{\text{eff}} H_{\text{eff}}^H) = \text{trace}\begin{pmatrix} [HP_C \ HP_D] \\ [P_C^H H^H \ P_D^H H^H] \end{pmatrix} \quad (7)$$
$$= \text{trace}(HP_C P_C^H H^H) +$$
$$\text{trace}(HP_D P_D^H H^H),$$

which is equivalent to maximizing the power of the dedicated pilots subject to the orthogonality constraint. This means that $P_D$ is chosen to maximize the signal strength orthogonal to the signal space defined by $P_C$. This can, for example, be calculated by performing an SVD on the signal space orthogonal to $P_C$, i.e. calculate $P_{\sim C}$, which is a set of vectors that span the rest of the signal space and then calculate the SVD of $H*P_{\sim C}$ and multiply the resultant vector by $P_{\sim C}$ to convert back to the transmitter space. Since S is equal to the identity matrix I in this case, the solution to maximizing (7) is for $P_D$ to be the top D singular vectors of $H*P_{\sim C}$. In other words, in this case PD can be determined according to $$P_D = \text{vectors which maximize power of dedicated pilots} \quad (8)$$
$$= \text{top } D \text{ singular vectors of } H*P_{\sim C}.$$

This solution may be relatively easy to converge to, or to converge to approximately, using iterative procedures or AoD based methods.

Determining $P_D$ to satisfy the above criteria can be done at the transmitter, or at the receiver and fed back to the transmitter, depending on the individual deployment.

Once $P_D$ has been chosen standard common pilot based procedures, such as pre-coding, transmit diversity (Alamouti, CDD), SM (Spatial Multiplexing), a combination of the three, etc., can be applied on top of $H_{\text{eff}}$. These schemes treat the dedicated pilots as common pilots. Once again, these schemes may be decided at either the transmitter or receiver depending on the deployment.

The choice of $P_D$ can also be based on additional criteria such as:
  Interference avoidance to other users for the purposes of collaborative MIMO, MU-MIMO (Multi-User-MIMO), etc.
  Mitigating Quantization effects of, for example, pre-coders, receivers, feedback, etc.
  Transmitting to multiple users simultaneously for the purposes of, for example, MU-MIMO, etc.

Simulated results of performance in terms of capacity in bits per second per Hz [bps/Hz] for simulated scenarios including 8 transmit antennas and two streams for a receiver having two, four and eight receive antennas for four different pilot schemes are summarized in Tables 1 and 2 below. The four pilot schemes that were simulated included an all common pilot scheme, an all dedicated pilot scheme, a pilot scheme with common pilots and a single dedicated pilot and a pilot scheme with common pilots and a variable number of dedicated pilots. The pilot scheme with common pilots and a single dedicated pilot uses dedicated pilots determined according to equation (8) above, while the pilot scheme with common pilots and a variable number of dedicated pilots uses the dedicated pilots determined according to equation (6) above. It is important to note that for simulation purposes for the results summarized in Table 1, for the pilot schemes that include dedicated pilots, it has been assumed that there is an additional unused dedicated pilot used for training, which in the simulated scenario represents an assumed 7% increase in overhead. In general, the increase in overhead associated with an additional dedicated pilot is an implementation specific detail.

TABLE 1

Summary of simulated performance for correlated Rayleigh fading environment (0.98 correlation factor) for full overhead

| Type | Common | Dedicated | Common + 1 | Common + variable |
|---|---|---|---|---|
| SNR for 1 bps/Hz 2 Rx antenna | −4.5 dB | −5.9 dB | −6 dB | −6.1 dB |
| SNR for 1 bps/Hz 4 Rx antenna | −7.6 dB | −8.1 dB | −8.2 dB | −8.3 dB |
| SNR for 1 bps/Hz 8 Rx antenna | −10.1 dB | −10.3 dB | −10.6 dB | −10.7 dB |
| SNR for 5 bps/Hz 2 Rx antenna | 9 dB | 11.7 dB | 9.3 dB | 9 dB |
| SNR for 1 bps/Hz 4 Rx antenna | 4.9 dB | 8.2 dB | 4.3 dB | 4.2 dB |
| SNR for 1 bps/Hz 8 Rx antenna | 1.9 dB | 5.6 dB | 1.4 dB | 1.4 dB |

As can be seen from the simulated results shown in Table 1, there is not a significant amount of gain which can be realized by dedicated pilots in the simulated 8 Tx antenna environment. The simulated results summarized in Table 2 consider the same situation as above for Table 1, but now without considering the extra dedicated pilot that was assumed to be used for training in the simulated results summarized in Table 1 (basically reducing the overhead for all dedicated schemes by 7% in the simulated scenario).

TABLE 2

Summary of simulated performance for correlated Rayleigh fading environment (0.98 correlation factor) only pilot overhead

| Type | Common | Dedicated | Common + 1 | Common + variable |
|---|---|---|---|---|
| SNR for 1 bps/Hz 2 Rx antenna | −4.6 dB | −6.9 dB | −6.8 dB | −6.9 dB |
| SNR for 1 bps/Hz 4 Rx antenna | −7.5 dB | −9.2 dB | −9.2 dB | −9.3 dB |
| SNR for 1 bps/Hz 8 Rx antenna | −10.2 dB | −11.5 dB | −11.6 dB | −11.8 dB |
| SNR for 5 bps/Hz 2 Rx antenna | 9.4 dB | 9.4 dB | 7.9 dB | 7.7 dB |
| SNR for 1 bps/Hz 4 Rx antenna | 4.9 dB | 5.9 dB | 3.1 dB | 3.1 dB |
| SNR for 1 bps/Hz 8 Rx antenna | 1.6 dB | 3.2 dB | 0.2 dB | 0.2 dB |

It is noted that with the small reduction in overhead (7% assumed), the gains go from 1.5 dB to 2.5 dB at low SNR and from 0.5 dB to 1.5 dB at high SNR.

The number of dedicated pilots which should be transmitted depends on several factors including H, $P_C$, level of the noise, and the transmission mode. Ideally it should be a careful balance between the overhead, and the performance gained. In practice suboptimal methods for choosing the number of dedicated pilots can be made, based on values such as SNR, rank, etc. In some embodiments, low SNR users would have 0 or 1 dedicated pilots while very high SNR users might have several or none depending on the dedicated pilot overhead and/or channel conditions.

Another option which reduces complexity and overhead is to separate the layers received from the common pilots and those received from the dedicated pilots. In this way some layers would be transmitted using a pre-coder aligned with the common pilots only (possibly using codebooks already designed for those common RS (Reference Signals)), while other layers would be aligned with the dedicated pilots.

This has several potential advantages:
When the multiple antennas are at multiple base stations, the data does not need to be shared between different base stations as one base station could transmit one part of the data using the common pilots while the other base stations transmit other parts of the data using the dedicated pilots.
The feedback design, receiver and codebook for the common pilots portion of the data can be reused with little modification allowing for ease of implementation.
The receiver does not need to calculate an effective channel for the dedicated pilot section due to the alignment of pilot and data.

Feedback for this scheme can occur in several ways depending on how much information is available at the receiver. In some cases, full channel knowledge may be available at the receiver. This could be achieved, for example, by transmission of low density "measurement" pilots explicitly for this purpose. The receiver can feedback quantized versions of the best transmit vector/matrix. This is commonly referred to as codebook based feedback, as a codebook of many different vectors/matrices (called codewords) is chosen. The receiver then chooses the codeword which allows for the best performance within that codebook. Common compression techniques taking advantage of time/frequency/spatial correlation can of course be applied. In some cases, the codebook is designed so that some pre-coding vectors are only non-zero over the common antenna ports, meaning that those pre-coding vectors include only common pilots. This way no dedicated pilots need to be transmitted to receive those streams. This savings of overhead could be considered at the receiver when choosing which codeword to feed back to the transmitter.

Some embodiments use two separate codebooks, one for the common pilots and one for ports which do not have common pilots. The codeword for both common and not common pilots would be fed back along with the number of streams to be transmitted in each space. Note that in some embodiments, the division of streams could be fed back at a lower rate or be fixed based on the rank. The transmitter could then follow the proposed transmission using dedicated pilots to provide updated demodulation pilots for the non-common pilot space. Optionally the transmitter, which may, for example, be an eNodeB in an LTE or LTE-A system, could transmit data fed back based on the common pilots space (possibly combined with spaces) using dedicated pilots. This is particularly applicable for rank 1 transmission in which only one stream is available.

In some circumstances it may not be worth while to maintain the orthogonality of $P_D$ and $P_C$ and combine the signal after the pilots. This may be the case, for example, in single stream SVD transmission, with a limited codebook. In that circumstance it may be preferable to just use dedicated pilots.

Without common pilots, two approaches may be utilized to achieve the full potential of a large number of transmit antennas; namely, 1) exploiting the reciprocal nature of a time division duplex channel to converge to the optimal SVD solution and 2) iterating over dedicated pilots to converge to the optimal solution.

For the second approach, an initial basic solution is to transmit dedicated pilots, in addition to those intended for the demodulation to help steer the transmitted signal toward SVD solution. The receiver, which may be a mobile terminal, feeds back information based on these dedicated pilots which are then used to choose the next dedicated pilots in an iterative manner. An example of a basic algorithm for this initial approach is as follows:

1) To support N streams send at least N+1 pilots.
2) Receiver feeds back its preferred pre-coding vector on those N+1 pilots.
3) Use the fed back vectors to create N new pre-coded pilots.
4) Find a new pilot orothogonal to the present pilots as well as the most recent previously transmitted pilots.
5) Repeat.

On the receiver side for this initial basic approach, the receiver:
a) performs SVD on effective received channel (i.e. $U*D*V'=P*H$); and
b) feeds back the first N columns of U, $U_{FB}$.

On the transmitter side for this initial basic approach, the transmitter:
a) generates new pre-coding matrix $P=U_{FB}P_{old}$; and
b) generates new "extra" vector orthogonal to P and last $N_{Tx}-(N+1)$ "extra" vectors, where $N_{Tx}$ is the number of transmit antennas.

A simple example scenario demonstrating the operation of this initial basic iterative approach is now described for a scenario that includes four transmit antennas and one receive antenna for one stream. The channel H is unknown to both the transmitter and the receiver. In a first step, the transmitter sends two orthogonal pilots $p_1=[1\ 1\ 1\ 1]/2$, $p_2=[1\ -1\ 1\ -1]/2$. In a second step, the receiver receives the vector [4-3] and feeds back MRC (maximal-ratio combining) combination [4/5-3/5]. In a third step, the transmitter uses the fed back signal to create a new vector $p_3=4/5p_1-3/5p_2=[1\ -7\ 1\ -7]/10$ and chooses a new vector $p_4=[1\ 1\ -1\ -1]/2$ that is orthogonal to $p_3$, $p_1$ and $p_2$. The transmitter then returns to step 2 and transmits $p_3$ and $p_4$.

The drawback to this scheme is that it has a very large overhead of an M×M unitary matrix. To reduce this a second modified version of the first scheme is considered in which rather than considering the signal space looks at the "null" space instead. This is the space in which power is being transmitted by the transmitter but not used for signal reception. These map to the unused eigenvectors in SVD decomposition.

In this second scheme, dedicated pilots are transmitted, in addition to those intended for the demodulation to help steer the signal toward the SVD solution. Rather than feed back where the transmitter should transmit the data, the receiver feeds back where the transmitter should avoid transmitting the data. An example of a basic algorithm for this second "null" space approach is as follows:

1) To support N streams send at least N+1 pilots.
2) Receiver feeds back its least preferred pre-coding vector on those N+1 pilots.

3) Make new vectors which are orthogonal to the fed back vector, which reduces the number of vectors by one.

4) Find a new pilot orthogonal to the present pilots as well as the most recent previously transmitted "bad" pilots.

5) Repeat.

On the receiver side for this second approach, the receiver:

a) performs SVD on effective received channel (i.e. U*D*V'=P*H); and b) feeds back the last column of U which corresponds to the smallest eigenvalue. This column is labelled $U_{bad}$.

On the transmitter side for this second approach, the transmitter:

a) determines bad pre-coding vector $P_{bad}=U_{bad}P_{old}$;

b) makes P orthogonal to $P_{bad}$, which reduces the rank by 1;

c) finds a new vector orthogonal to P, $P_{bad}$ and a stored set of at most $N_{Tx}-(N+1)$ stored Pbad from previous transmissions;

d) adds $P_{bad}$ to set S; and e) if $|S|>N_{Tx}-(N+1)$, the transmitter removes an element of S which had the smallest magnitude of $U_{bad}$ corresponding to the "extra" vector.

Simulation results of this second approach over an uncorrelated channel for both ML (Maximum Likelihood) and ZF (Zero Forcing) receivers assuming four or eight transmit antennas, $N_{Tx}=4$ or 8, and between one to eight receive antennas, $N_{Rx}=1$ to 8, has shown that this second method converges as fast or faster than the initial basic approach discussed above, while using less feedback overhead. However, because the feedback only tells the transmitter where a signal should not be transmitted, the various eigenmodes of the signal space are randomly mixed together. Accordingly, simulation results indicate that performance for the ZF receiver, in terms of its ability to capture power of the transmitted signal, is less than that of the ML receiver for this second approach, as the ML receiver is able to capture more of the transmitted signal. For this reason, a ML receiver may be preferred for use in conjunction with this second approach.

To deal with the foregoing issue associated with the second approach, a third approach is considered, in which the receiver still feeds back a single vector; however, in this third approach the receiver adaptively chooses to transmit a vector corresponding to either one of the transmit streams or the "null" space. Effectively, this third approach is a "mixed" scheme that combines the first and second approaches. In this third "mixed" scheme, the transmitter transmits dedicated pilots, in addition to those intended for demodulation, to help steer the signal toward the SVD solution. The receiver adaptively transmits a vector relating to either one of the streams or feeds back where the transmitter should avoid transmitting the data. An example of a basic algorithm for this second "null" space approach is as follows:

1) To support N streams send at least N+1 pilots.

2) Receiver feeds back its vector relating to either one of the streams or the worst "null" space. This choice of layer depends on where the most gain can be achieved.

3) The transmitter uses the feedback from the receiver to update the next set of pilots, using one of the above two schemes based on what type of feedback the receiver provides, i.e. relating to either one of the streams or the worst "null" space.

4) Repeat.

On the receiver side for this third "mixed" approach, the receiver:

a) performs SVD on effective received channel (i.e. U*D*V'=P*H); and b) feeds back the column of U which maximizes (1−abs (diag(U))^2)*W, where W=D(i, i), for the first N pilots and mean(W(1:N))−W(N+1) for the last "null" pilot, as well as feeds back which column of U it is feeding back.

On the transmitter side for this third "mixed" approach, the transmitter:

a) determines update pre-coding vector $P_{update}=U_{bad}P_{old}$;

b) makes P orthogonal to $P_{update}$, and replaces the appropriate layer $$P=P-(P*P_{update}')*P_{update} \qquad (9)$$

$$P(\text{layer},:)=P_{update}; \qquad (10)$$

c) calculates $P_{bad}=P(\text{end},:)$;

d) finds a new vector orthogonal to P and a stored set of at most $N_{Tx}-(N+1)$ stored $P_{bad}$ from previous transmissions;

d) adds $P_{bad}$ to set S; and e) if $|S|>N_{Tx}-(N+2)$, the transmitter removes an element of S which had the smallest magnitude of $U_{bad}$ corresponding to the "extra" vector.

Simulation results of this third "mixed" approach over an uncorrelated channel for both ML (Maximum Likelihood) and ZF (Zero Forcing) receivers assuming four or eight transmit antennas, $N_{Tx}=4$ or 8, and between one to eight receive antennas, $N_{Rx}=1$ to 8, has shown that this third "mixed" approach converges quickly and works for both ML and ZF receivers.

In some cases, designing a codebook for the three above schemes may have two objectives: 1) have the codebook span the vectorspace to ensure fast ramp up times; and 2) have fine granularity near the converged point where the magnitude of the main stream is close to one. Using the above three schemes, the granularity of the codebook limits the final converged value of the scheme. For an evenly spaced codebook, which may not represent an optimally spaced codebook, simulation has shown that for the first simple approach, six bits of feedback allow the receiver to eventually capture more than 90% of the power.

In some cases, the main beam may be weighted by 3 dB, i.e., the magnitude of the main stream codebook is doubled relative to the others. In this case, the codebook may be varied depending on which layer was feedback from the receiver so that the appropriate layer is scaled.

In some cases, the codebook may be changed based on how many identity or near identity vectors/matrices have been fed back recently, e.g. how many [1 0]'s have been fed back from a receiver with two receive antennas. In one particular example, the weighting of the main beam is increased by 3 dB whenever four feedbacks are close (e.g. less than half the magnitude of the largest vector in that direction) to the identity feedback. Simulation results for this approach indicated that the asymptotic performance is different from that of the 3 dB weighted approach described above, but the initial ramp up performance remains the same. Another issue to consider is the use of [1 0] in the codebook. When storing the relative importance of each "null" space vector, rather than storing 1, the minimum value that 1 might represent may be stored, i.e. Max(codebook(1,:)).

For configurations that include two or more streams it has been observed through simulation that reaching an asymptotic levels of performance in terms of percentage of total power captured by the receiver with respect to time after initial ramp up typically requires a higher number of bits of feedback. This is partially because of the granularity in the phase direction, i.e. if two vectors cannot be combined with the correct phase due to granularity of the codebook the feedback gets "stuck".

When common pilots are mixed with dedicated pilots as discussed previously, the dedicated pilots may be kept orthogonal to the common pilots and an additional pre-coding vector may be transmitted after the common/dedicated pilots. In some cases, performance will be limited by the granularity of this pre-coder.

For illustrative purposes, an example of an embodiment of the present invention, that may, for example, be implemented in an advanced wireless communication system, such as an LTE-A (Long Term Evolution-Advanced) communication system, will now be described with reference to FIG. 10. In the example embodiments, the CRS (common reference signals) from release 8 of the 3GPP (3rd Generation Partnership Project), which is available on the internet at http://www.3gpp.org/Release-8 and hereby incorporated by reference in its entirety, and additional UE-specific DRS (dedicated reference signals) are both used simultaneously when multiple streams are transmitted. In the example embodiment, some streams are transmitted using just the release 8 CRS (and possibly the release 8 Codebook) while others are aligned with the additional DRS. This allows the CRS overhead to be used effectively, while potentially minimizing the increased overhead due to the additional DRS.

In this embodiment an 8 transmit antenna system with either 4 or 8 receive antennas has been assumed. We consider 2 different schemes for transmission:

1) The DRS are pre-coded along with the data streams.
  The pre-coder is chosen based on either codebook feedback using 4, 6 or 8 bit codebooks or using the infinite feedback SVD pre-coder.
2) The DRS are pre-coded along with some data streams, other data streams are transmitted using the Release 8 methodology (CRS and codebook).
  The pre-coder is chosen based on an 8 bit codebook feedback, which is built by concatenating two Release 8 codebooks together. Effectively this means that the release 8 codebook is feedback based on the first 4 CRS and a second release 8 codebook is feedback on transmit antennas 5-8. Any layers transmitted using the second PMI are accompanied with DRS. The division of layers between the CRS and the DRS is assumed fixed based on the rank of the channel. This ensures that the feedback rate is the same for both schemes.

In this section, we present some link level analysis of the two schemes mentioned above. For the DRS only schemes, we consider 4 different granularities of feedback, 4 bit, 6 bit, 8 bit codebooks and infinite SVD codebook. The feedback is assumed to be chosen perfectly with a 3 ms delay.

We use Goodput as our metric. Goodput is the application level throughput, i.e. the number of useful bits per unit of time forwarded by the network from a certain source address to a certain destination, excluding protocol overhead, and excluding retransmitted data packets. First the BLER (Block Error Rate) using link to system mappings for different channels was generated. The overhead for the different schemes were calculated and the Goodput was generated using the following formula $$Goodput = C_{MCS} * (1 - BLER) * (1 - \% \ CP) * \quad (11)$$
$$(1 - \% \ BW \ \text{unused}) *$$
$$(1 - \% \ \text{control} - \% \ CRS - L_{DRS} * \% \ DRS)$$
$$= C_{MCS} * (1 - BLER) * 0.84 * (0.71 - L_{DRS} / 28).$$

Where $L_{DRS}$ is the number of DRS layers present, and $C_{MCS}$ is the capacity of the MCS used (i.e. $\text{Log}_2(QAM)*\text{rate}$). These Goodputs were then averaged over a large number of independently generated channels.

The simulation assumptions made when simulating the performance of the above embodiments are summarized below in Table 3.

TABLE 3

| | |
|---|---|
| MCS used | QSPK, 16 QAM, 64 QAM |
| | Rate 1/6, 1/3, 1/2, 2/3, 3/4, 4/5 |
| DRS overhead | 1/28 per layer (6 RE per layer per RB) |
| CRS overhead | 1/7 for 4 Tx CRS |
| Control overhead | 2 symbols |
| Feedback granularity | 2 RB |
| Allocation Size | 2 RB |
| Channel | TU, uncorrelated 8 × 8, 3 km/h |
| BW | 5 MHz |
| Feedback Delay | 3 ms |
| Codebook used | 4 bit |
| | 6 bit |
| | 8 bit computer generated from QPSK symbols |
| CSI | Assumed perfectly known |
| Rank Adaptation | Assumed perfect with 3 ms delay |
| MCS adaptation | Assumed perfect with 3 ms delay |
| Link to System Mapping | Constrained Capacity to AWGN curves |
| CP overhead | $(6*9+10)/(7*128+6*9+10) = 1/15 = 6.6\%$ |
| BW unused | 0.1 |
| | Approximate value based on unused spectrum in guard bands |

| Layer division for Mixed Method | Rank | 1 | 2 | 3 | 4 | 5 | 6 | 7 | 8 |
|---|---|---|---|---|---|---|---|---|---|
| | CRS layer | 0 | 1 | 2 | 3 | 3 | 4 | 4 | 4 |
| | DRS layer | 1 | 1 | 1 | 1 | 2 | 2 | 3 | 4 |

Figure 10:
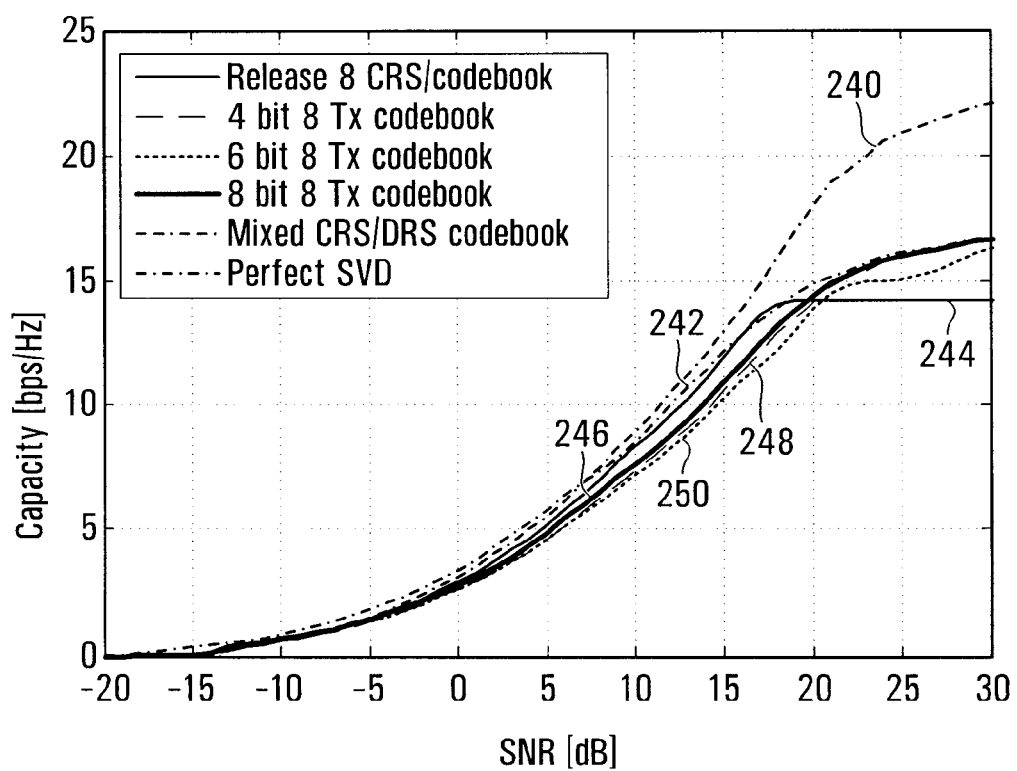
FIG. 10 is a plot of simulated results of signal to noise ratio vs. capacity for various pre-coding schemes.

FIG. 10 is a plot of the simulated results of signal to noise ratio vs. capacity for various pre-coding schemes including the above embodiment of the present invention. The plot includes curves of performance, in terms of capacity w.r.t. SNR for the 3GPP release 8 CRS and codebook 244, a 4 bit 8 Tx codebook 248, a 6 bit 8 Tx codebook 250, an 8 bit 8 Tx codebook 246, a mixed CRS/DRS codebook in accordance with the above embodiment of the present invention 240 and perfect SVD feedback 242.

The performance of the mixed mode scheme (mixed CRS/DRS codebook 240) outperforms all the other codebook-based designs at all SNRs, and for SNR greater than 7 dB even outperforms perfect SVD feedback. This is due to the substantially lower overhead needed to achieve high layer transmission, as well as the large effective codebook size (4+4=8 bit codebook). In Table 4 below we see the relative performance between a 8 bit codebook design 246 and the mixed mode performance 240. We see that gains of 5-30% are achievable with comparable complexity.

TABLE 4

| SNR | −5 dB | 5 dB | 15 dB | 25 dB |
|---|---|---|---|---|
| Performance improvement | 5.13% | 16.7% | 24.2% | 30.6% |

Note that due to the relatively higher density of CRS, as well as the ability to interpolate from neighboring RB (Resource Blocks), when real channel estimation is considered mixed mode performance may perform relatively even better than observed above.

In this embodiment the performance of a complementary CRS scheme in which the CRS are used in conjunction with the DRS has been considered. It has been found that due to the significantly reduced overhead the performance of the combined scheme is significantly better than only using DRS. For this reason we believe that such a scheme may be advantageously used for transmissions in advanced wireless communications systems, such as LTE-A communication systems.

The above example embodiment is described in R1-091390 "Complementary CRS Design" 3GPP TSG-RAN WG1 #56 Seoul, Korea, Mar. 23-27, 2009, which is hereby incorporated by reference in its entirety.

An example of a method of transmitting from a transmitter on a communication link using a set of mixed pilots in accordance with an embodiment of the present invention will now be described with reference to the flowchart shown in FIG. 11.

The method begins at block 300, in which a number D of dedicated pilots are selected having regard to performance of the communication link, where D≥0. The communication link may be, for example, a MIMO channel between a base station, such as an EnodeB in an LTE or LTE-A wireless communication system, and a wireless terminal. In some embodiments, the selection may be made based on potentially maximizing the throughput of the communication link.

In block 302, a first pre-coder is selected for pre-coding D dedicated pilots based on some criteria. This criteria, may be, for example, the received power of the dedicated pilots at an intended receiver. In some embodiments, the selection of the first pre-coder may be an iterative process that, for example, includes receiving feedback from a receiver and adapting the first pre-code based on the feedback.

In block 304, a first pre-coding is performed on the D dedicated pilots with the first pre-coder to produce a set of pre-coded dedicated pilots.

In block 306, the set of pre-coded dedicated pilots are combined with a set of common pilots and a second pre-coding is performed on the set of pre-coded dedicated pilots and the set of common pilots to produce a set of mixed pilots. In some cases, this second pre-coding involves pre-coding the pre-coded dedicated pilots with the identity matrix for spatial multiplexing and pre-coding the common pilots with a codebook.

In block 308 data is transmitted from the transmitter on the communication link with the set of mixed pilots.

Figure 11:
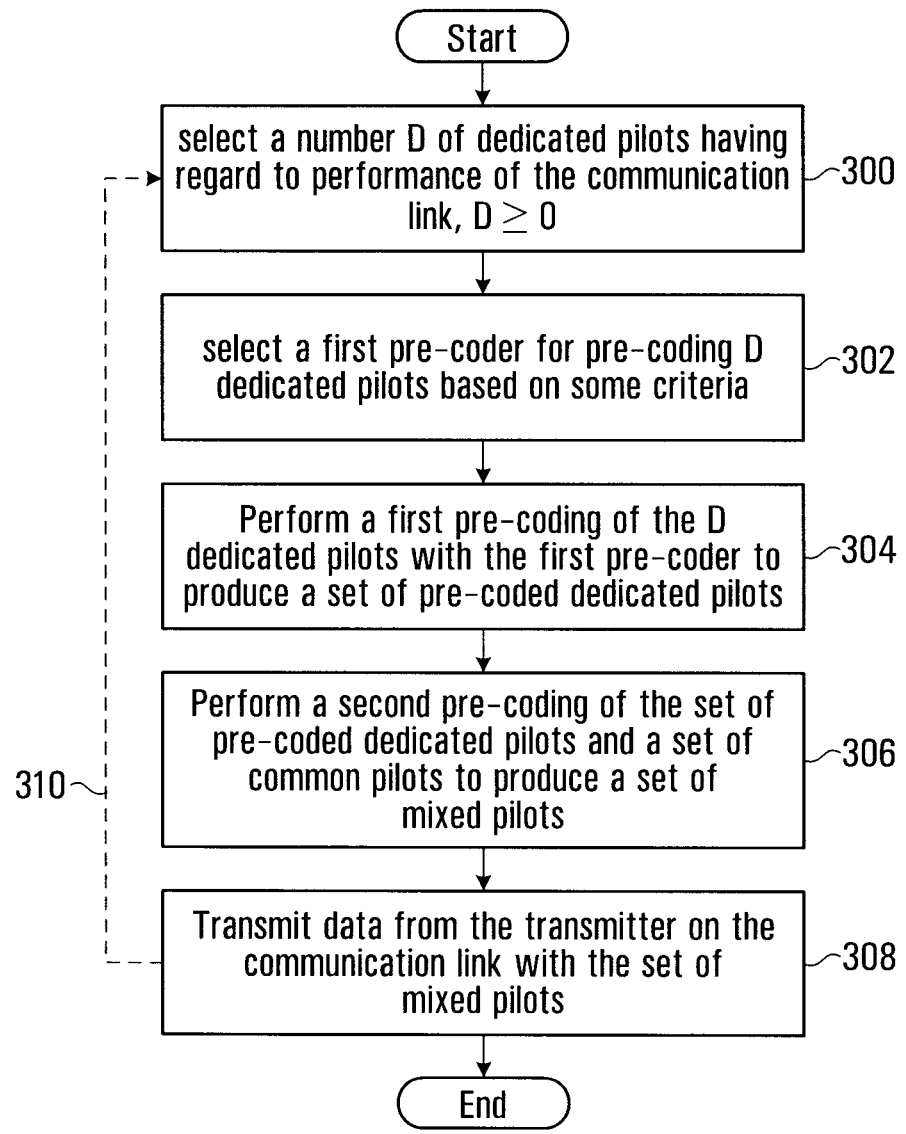
FIG. 11 is a flowchart of a method of transmitting from a transmitter on a communication channel using a set of mixed pilots in accordance with an embodiment of the present invention.

In some embodiments, the method returns to block 300 and the method may begin again, as indicated at 310 in FIG. 11. Depending on changes to channel characteristics between the transmitter and a receiver, the number and/or the first pre-coding matrix may be adapted to suit the changes.

The foregoing description includes many detailed and specific embodiments that are provided by way of example only, and should not be construed as limiting the scope of the present invention. Alterations, modifications and variations may be effected to the particular embodiments by those of skill in the art without departing from the scope of the invention, which is defined solely by the claims appended hereto.

The invention claimed is:

1. A method of transmitting from a transmitter on a communication link, the method comprising:
    selecting a number D of dedicated pilots having regard to performance of the communication link, wherein D is greater than 0;
    selecting a first pre-coder for pre-coding D dedicated pilots based on some criteria, wherein the selecting the first pre-coder comprises selecting the first pre-coder to increase received power of the D dedicated pilots, subject to a constraint that the first pre-coder remain orthogonal to a second pre-coder used to pre-code a set of common pilots;
    performing a first pre-coding of the D dedicated pilots with the first pre-coder to produce a set of pre-coded dedicated pilots;
    performing a second pre-coding of the set of pre-coded dedicated pilots and the set of common pilots, wherein performing the second pre-coding comprises pre-coding the set of common pilots with a code book;
    mixing the pre-coded common pilots and the second pre-coded dedicated pilots to produce a set of mixed pilots;
    performing the second pre-coding on data to align the set of mixed pilots with the data; and
    transmitting the second pre-coded data from the transmitter on the communication link with the set of mixed pilots.

2. The method of claim 1, wherein the transmitter includes a plurality of transmit antennas and transmitting data from the transmitter comprises transmitting the data from the transmitter on the communication link with the set of mixed pilots via the plurality of transmit antennas.

3. The method of claim 2 wherein performing the second pre-coding comprises performing a transmit diversity based pre-coding.

4. The method of claim 1, further comprising, receiving feedback pertaining to the first pre-coding of the D dedicated pilots.

5. The method of claim 4, wherein selecting the first pre-coder for pre-coding the D dedicated pilot based on some criteria is an iterative process based on the feedback.

6. The method of claim 1, wherein selecting the first pre-coder further comprises selecting the first pre-coder to mitigate interference caused by transmitting the data with the set of mixed pilots.

7. The method of claim 1, wherein transmitting data on the communication link with the set of mixed pilots via the plurality of transmit antennas comprises:
    transmitting the dedicated pilots of the mixed set of pilots on a first set of transmit antennas of the plurality of transmit antennas; and
    transmitting the pre-coded common pilots of the mixed set of pilots on a second set of transmit antennas of the plurality of transmit antennas.

8. The method of claim 7, wherein the transmitter comprises a plurality of transmitters and the first set of transmit antennas is located at a first one of the plurality of transmitters and the second set of transmit antennas is located at a second one of the plurality of transmitters.

9. The method of claim 8, wherein transmitting the data with the set of mixed pilots comprises transmitting the data cooperatively from at least the first transmitter and the second transmitter of the plurality of transmitters.

10. A wireless terminal comprising a wireless transceiver configured to receive a transmission containing data and a set of mixed pilots generated according to the method of claim 1.

11. A wireless communication system comprising:
    a plurality of wireless terminals; and
    a base station having a plurality of transmit antennas and configured to transmit data to the plurality of wireless terminals on respective communication links, wherein for each communication link, the base station is configured to:
        select a number D of dedicated pilots having regard to performance of the communication link, wherein D is greater than 0;
        select a first pre-coder for pre-coding D dedicated pilots based on some criteria, wherein the selecting the first pre-coder comprises selecting the first pre-coder to increase received power of the D dedicated pilots, subject to a constraint that the first pre-coder remain orthogonal to a second pre-coder used to pre-code a set of common pilots;

perform a first pre-coding of the D dedicated pilots with the first pre-coder to produce a set of pre-coded dedicated pilots; perform a second pre-coding of the set of pre-coded dedicated pilots and the set of common pilots, wherein performing the second pre-coding comprises pre-coding the set of common pilots with a code book;

mix the pre-coded common pilots and the second pre-coded dedicated pilots to produce a set of mixed pilots;

perform the second pre-coding on data to align the set of mixed pilots with the data; and transmit the second pre-coded data from the base station on the communication link with the set of mixed pilots.

12. The system of claim 11, wherein the base station is configured to perform the second pre-coding by performing an SVD (Singular Value Decomposition) based pre-coding, or an approximation thereof.

13. The system of claim 11 wherein the base station is configured to perform the second pre-coding by performing a transmit diversity based pre-coding.

14. The system of claim 11, wherein the base station is further configured to:

transmit the dedicated pilots of the mixed set of pilots on a first set of transmit antennas of the plurality of transmit antennas; and transmit the pre-coded common pilots of the mixed set of pilots on a second set of transmit antennas of the plurality of transmit antennas.

15. The system of claim 14, wherein the base station comprises a plurality of base stations, and the first set of transmit antennas is located at a first one of the plurality of base stations and the second set of transmit antennas is located at a second one of the plurality of base stations.

16. The system of claim 15, wherein at least the first base station and second base station of the plurality of base stations are configured to cooperatively transmit the data with the set of mixed pilots.

17. A base station configured to transmit data on a communication link, the base station comprising:

a plurality of transmit antennas;
a pre-coder configured to:

select a number D of dedicated pilots having regard to performance of the communication link, wherein D is greater than 0;

select a first pre-coder for pre-coding D dedicated pilots based on some criteria, wherein the selecting the first pre-coder comprises selecting the first pre-coder to increase received power of the D dedicated pilots, subject to a constraint that the first pre-coder remain orthogonal to a second pre-coder used to pre-code a set of common pilots;

perform a first pre-coding of the D dedicated pilots with the first pre-coder to produce a set of pre-coded dedicated pilots; and perform a second pre-coding of the set of pre-coded dedicated pilots and the set of common pilots, wherein performing the second pre-coding comprises pre-coding the set of common pilots with a code book;

mix the pre-coded common pilots and the second pre-coded dedicated pilots to produce a set of mixed pilots;

perform the second pre-coding on data to align the set of mixed pilots with the data; and a radio transmitter configured to transmit the second pre-coded data on the communication link with the set of mixed pilots via the plurality of transmit antennas.

18. The base station of claim 17, wherein the pre-coder is configured to perform the second pre-coding by performing an SVD (Singular Value Decomposition) based pre-coding, or an approximation thereof.

19. The base station of claim 17 wherein the pre-coder is configured to perform the second pre-coding by performing a transmit diversity based pre-coding.

20. The base station of claim 17, wherein the wireless transmitter is further configured to:

transmit the dedicated pilots of the mixed set of pilots on a first set of transmit antennas of the plurality of transmit antennas; and transmit the pre-coded common pilots of the mixed set of pilots on a second set of transmit antennas of the plurality of transmit antennas.

21. The base station of claim 20, wherein the base station comprises a plurality of transmission sites, and the first set of transmit antennas is located at a first one of the plurality of transmission sites and the second set of transmit antennas is located at a second one of the plurality of transmission sites.

22. The base station of claim 20, wherein the wireless transmitter is configured to cooperatively transmitter.

* * * * *